United States Patent [19]
Habicht

[11] 3,856,023
[45] Dec. 24, 1974

[54] DRUM FOR ROTARY DECK THRESHER

[75] Inventor: Bernard G. Habicht, Saskatoon, Saskatchewan, Canada

[73] Assignee: Western Roto Thresh Ltd., Saskatoon, Saskatchewan, Canada

[22] Filed: Aug. 14, 1972

[21] Appl. No.: 280,244

[30] Foreign Application Priority Data
June 14, 1972 Canada .............................. 144686

[52] U.S. Cl. .......................................... 130/27 Q
[51] Int. Cl. .......................................... A01f 12/44
[58] Field of Search ............... 130/27 R, 27 T, 27 Q

[56] References Cited
UNITED STATES PATENTS

| | | | |
|---|---|---|---|
| 820,265 | 5/1906 | Slutz et al. | 130/27 Q |
| 961,775 | 6/1910 | Herr | 130/27 Q |
| 2,129,452 | 9/1968 | Van Sickle | 130/27 Q |
| 2,811,158 | 10/1957 | Rietmann | 130/27 Q |
| 3,126,893 | 3/1964 | Palmer | 130/27 Q |

Primary Examiner—Antonio F. Guida
Attorney, Agent, or Firm—Stevens, Davis, Miller & Mosher

[57] ABSTRACT

A rotary deck for threshing machines separates grain and other granular material from straw after the material is passed through a threshing machine. The deck is perforated to the point where its open area is between 30 and 90 percent of its surface. The deck may be a horizontal straight sided cylinder and, it may have a major and minor diameter instead of a straight sided configuration. The rotational speed of the deck is such that a centrifugal force in the range of 0.7 to 1.7 times gravity is produced at the peripheral surface.

8 Claims, 7 Drawing Figures

DRUM FOR ROTARY DECK THRESHER

This invention relates to rotary deck threshing machines and in particular to a rotary drum for such machines.

Rotary deck threshers differ in principle from conventional combines which use "straw walker" types of devices for grain separation. Rotary separators subject the threshed straw and granular material to a tumbling and centrifugal action to remove the granular material from the straw. In copending U.S. applications Ser. No. 222,084, filed Jan. 31, 1972, now abandoned in favor of continuation Ser. No. 369,004, filed June 11, 1973, and Ser. No. 233,259, filed Mar. 9, 1972, now a U.S. Patent, there are disclosed rotary deck threshing machines utilizing pneumatic classifiers in combination with a rotary drum deck and the present application is directed to a rotary drum deck for use with such machines.

In accordance with application Ser. No. 369,004, the threshing machine therein picks up a grain and straw mixture and passes it through the nip of a rotary threshing cylinder and concave. The material is discharged from the concave into the interior of the drum where it is rotated and forced against the inner facing of the drum by centrifugal action whereby the grain passes through openings in the drum wall, subsequently to be conveyed to the clearning section of the machine.

The present invention is directed to the optimum configuration, size and relative rotational speed of a drum or deck for a rotary thresher. According therefore to a broad aspect the invention relates to a rotary deck for threshing machines for separating granular material from straw after threshing; said deck comprising a horizontally oriented tube; said deck being perforated to the extent of 30–90 percent of its surface and being adapted for rotation at a speed to to produce a peripheral centrifugal force between 0.7 to 1.7 times the value of gravity.

The invention is illustrated by way of example in the accompanying drawings wherein.

GENERAL DESCRIPTION

Figure 1:
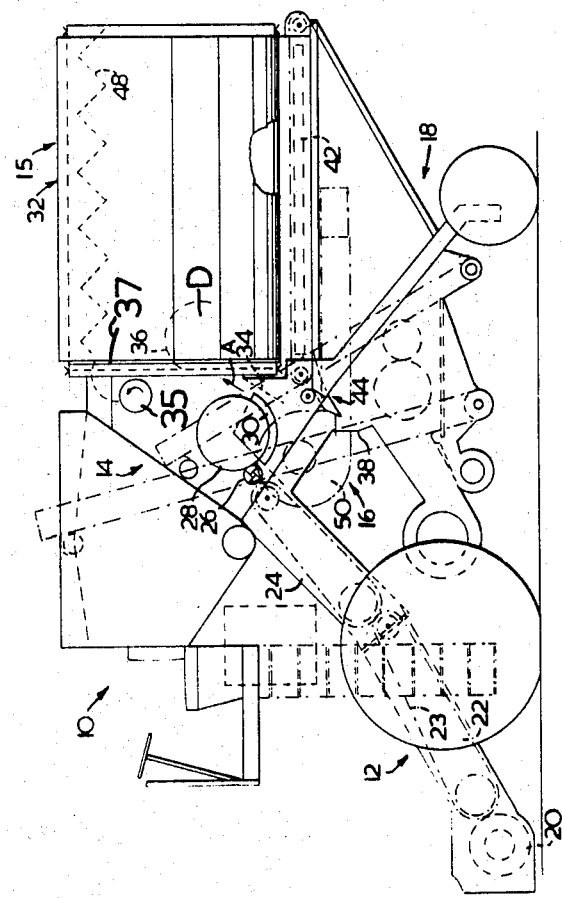
FIG. 1 is a schematic elevation of a combine harvester utilizing the present invention.

Referring to FIG. 1, the combine 10 includes a table section 12, a threshing section 14, a separator section 15, a classifying section 16 and finally a cleaning section 18.

The table section 12 includes a table auger 20 which, when rotating, moves the material for threshing towards the center of a primary feed 22 comprising a conveyor 23. Primary feed 22 in turn passes the material to be threshed to a secondary feed 24 to a combination spreader and feeder 26 which spreads the material across the face of a threshing cylinder 28 whereby the material is more evenly fed to the nip of the concave 30.

The velocity of the threshed material imparted to it by the threshing cylinder 28 deflects it upwardly in the direction of arrow A to enter the forward end of the rotary deck 32 through the guidance of a deflector plate 34 and eyebrow deflector 36. Some grain which is immediately separated from the straw and chaff in the concave drops downwardly into the throat 38 of the classifying section 16. The deflector 36 directs the flow of threshed material into the drum 32 in such a manner as to impart a substantially vertical downward trajectory onto the inner surface of the rotary deck. The dimension D may vary from twelve to thirty-six inches from the front edge of the drum with about twenty-two inches being preferred. A movable air deflector 37 is positioned above straw and grain deflector 36 to adjust the direction of air from a fan 35 into the rotary deck 32.

The threshed material is rotated with the deck 32 at a rotational speed sufficient to produce a centrifugal force which assists separation around the entire periphery of the drum. The grain and chaff are forced through openings in the drum surface thereafter to be deposited on a conveyor 42 which carries the grain forwardly to an area 44 terminating adjacent the throat 38 as shown. The straw, weed stalks and the like remaining in the deck 32 are carried outwardly through the rear opening thereof. It will be noted from FIGS. 1 and 2 that an auger 48 positioned adjacent to the inner periphery of the drum serves to strip any straw and the like that may be adhered to the inner surface of the deck and which fails to loosen and fall by gravity to the lower surface thereof.

Figure 2:
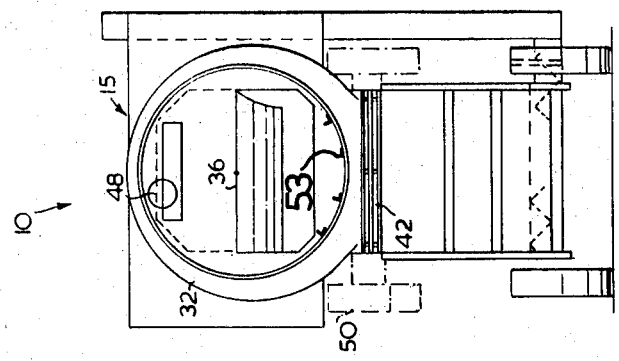
FIG. 2 is an end elevation of the machine in FIG. 1.
Figure 3:
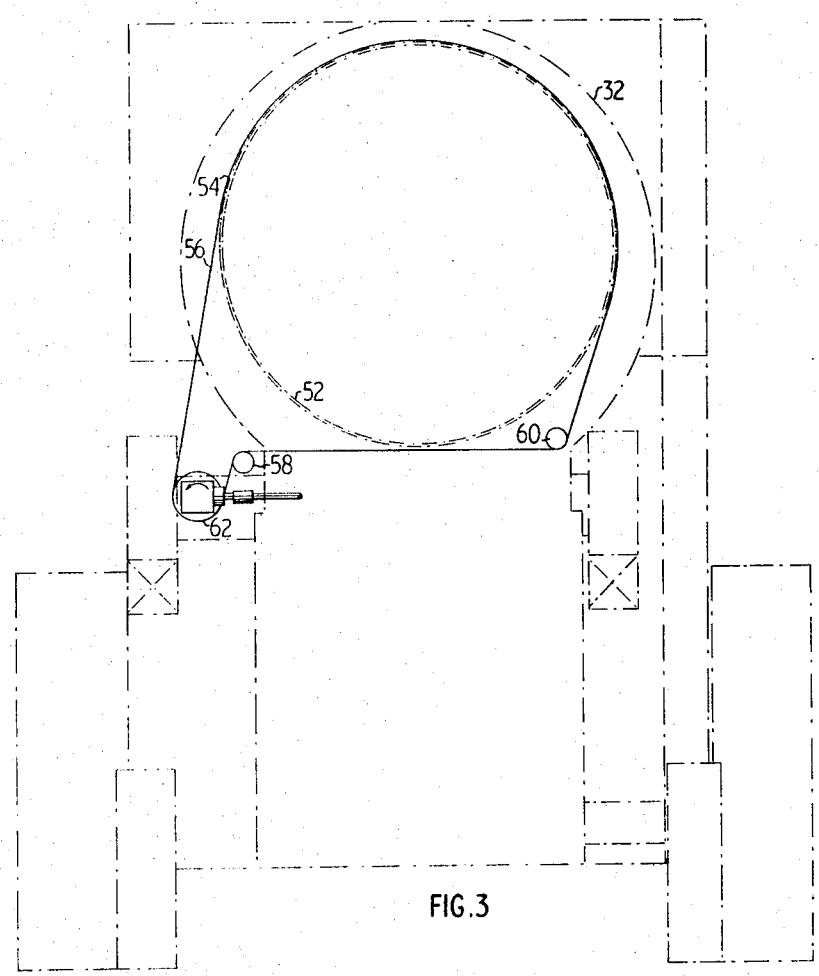
FIG. 3 shows one method of rotating the deck.

As shown in FIG. 3, the deck 32 may be provided with a flange 52 and sprocket 54 and rotated through the action of a chain 56 trained about idle rollers 58 and 60 and actuated by a sprocket 62 rotated by motor means, not shown. As shown in FIG. 2 risers or cleats 53 may be employed on the inner periphery of the rotary deck 32 to assist in imparting a rotary motion of material therein.

Figure 4A:
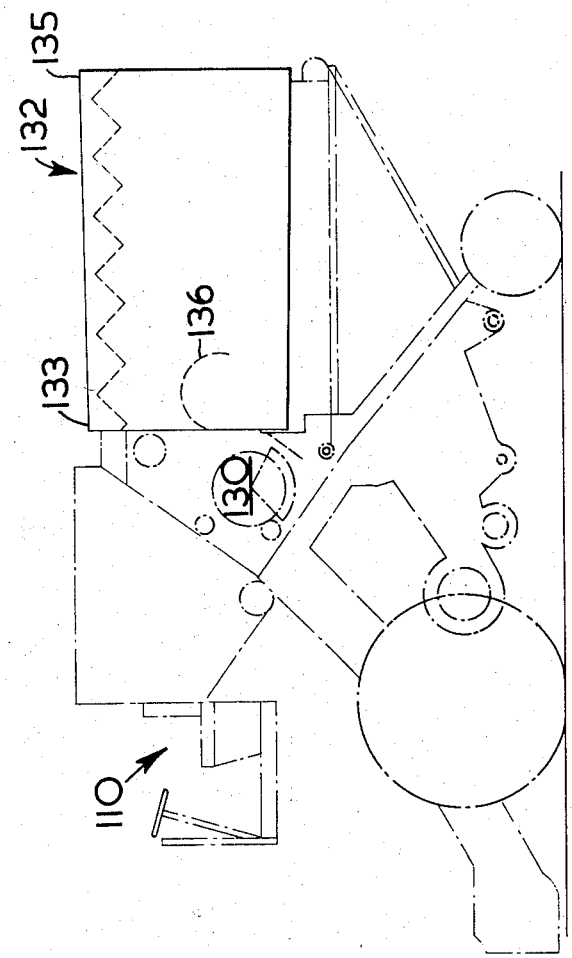
FIG. 4a is a schematic view similar to FIG. 1, showing an alternate form of the deck.

The deck 32 may be formed of any polygonal cross section which will provide the desired combination of centrifugal and gravitational forces for grain separation. The deck can be straight sided or can have a major or minor diameter with the minor diameter being placed adjacent the concave 30. This configuration is illustrated in FIG. 4a wherein apparatus 110 includes rotary deck 132 mounted in the same manner as the deck 32 in FIG. 4. However, in FIG. 4a, the deck is illustrated with minor diameter end 133 and major diameter end 135, minor diameter end 133 being adjacent concave 130.

Figure 4:
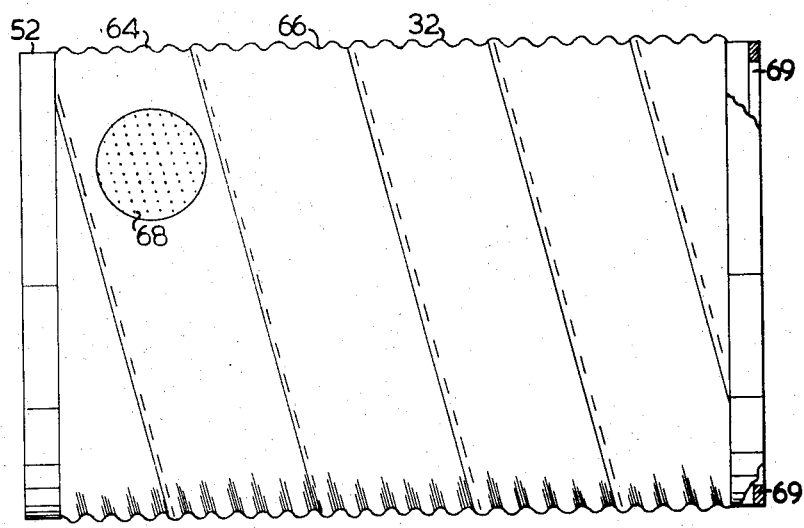
FIG. 4 is an elevation view of one form of deck according to the invention.

In FIG. 4 the deck 32 is a straight sided cylinder having a corrugated surface 64. The corrugations may be plain or formed in a rifled pattern 66, as shown, the surface of the deck having perforations 68 therein to the extent of 30 to 90 percent of the deck surface. The perforations can be of any shape and preferably should be ¼ inch to 1½ inches on the major axis of the opening. One or more fans (such as fan 35) may be utilized, if necessary, to assist in moving straw through the deck or the air output from one of the aspirator fans can be directed into the rotary deck 32 to effect this movement. However, such assistance is not usually required, especially if the deck 32 is, in rifled form. An outer or shroud drum which encloses the deck 32 has been omitted for clarity.

A retaining lip or flange 69 projects into the deck 32 at or adjacent the rear edge of the deck exit to prevent loss of grain kernels and hold them till they pass through onto the conveyor 42. It is also to be noted that the deck 32 may be uniformly perforated or the perforations may vary in percentage from front to back of the deck 32.

OPERATION OF ROTARY DECK

The diameter of the deck 32 may vary but the speed of rotation of the deck 32 is fairly critical.

As mentioned previously the forces present in the rotary deck 32 contribute to the separation of the grain from the straw and provide agitation to enable separation to occur. A rotating mass is subjected to centrifugal force as determined by the equation, $F = WV^2/gr$ where
 $F$ = centrifugal force
 $W$ = weight
 $V$ = peripheral velocity
 $g$ = acceleration of gravity
 $r$ = radius of curved path The mass is also subjected to the downward force of gravity or the weight w.

Figure 5:
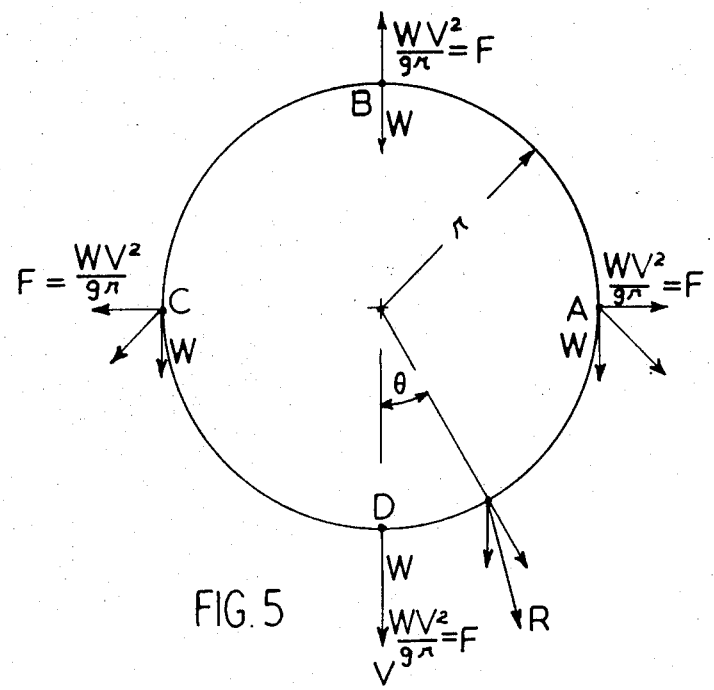
FIGS. 5 and 6 are schematic cross sections of a rotary deck illustrating centrifugal and gravitational direction points thereon.

Referring to FIG. 5 a schematic cross-section of the rotary deck 32 illustrates points on the periphery of the deck 32 and the direction of the various forces. The weight W is a constant force always acting downward. The value of the centrifugal force:

$F = WV^2/gr$ is determined by the peripheral velocity and the radius $r$. Both the peripheral velocity and radius are variables depending on the location of the particle (a kernel of grain or straw) within the confines of the rotary deck 32. This centrifugal force F is a maximum when the particle is at the periphery of the rotary deck 32 when rotating at the peripheral speed. At any other location or speed (if there is slippage against the rotary deck 32 the speed will be less) the centrifugal force will be lower.

As shown in FIG. 5, it can be seen that the direction of the centrifugal force changes as the particle assumes different locations around the deck periphery or at any other location within the rotary deck 32. If the speed of rotation and the radius of rotation of a particle are such as to produce a centrifugal force equal to the weight of the particle or grain kernel the resultant forces on that kernel are shown. At the bottom of the deck the resultant force is equal to 2W while at the top of the deck the resultant force is zero. The magnitude of the resultant forces at other points around the drum are dependent on the position but vary from 2W to zero; the direction of these forces is constantly changing as the deck 32 rotates thus assisting the kernels to find their way through the deck perforations 68.

Figure 6:
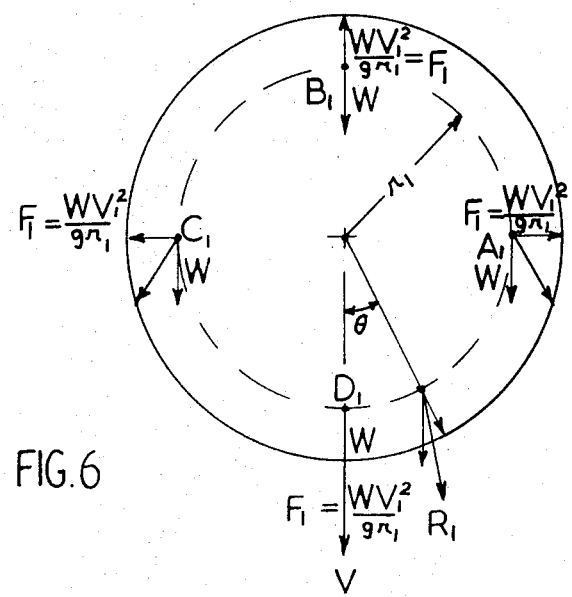

Referring to FIG. 5
Resultant force at position A = resultant force at point C
$\sqrt{W^2 + (WV^2/gr)^2}$
At point B the resultant force is
$W - WV^2/gr$
At point D the resultant force is $W + WV^2/gr$
and
 $R$ = resultant force at any angle $\theta$ $R = \sqrt{(W + [W/g][V^2/r] \cos \theta)^2 + ([W/g][V^2/r] \sin \theta)^2}$ Referring to FIG. 6 where the particle or kernel is not at the outside or periphery of the rotary deck it can be seen that the centrifugal force $F_1$ is less. At the uppermost point on the circle of radius $r_1$ the centrifugal force on the kernel may not be equal to W and the kernel can fall; this provides the necessary agitation for separation. As in FIG. 5 the direction of the resultant force changes as the kernel rotates and provides further opportunity for separation.

Resultant force at
$A_1 = C = \sqrt{W^2 + (WV_1^2/gr_1)^2}$
$B_1 = W - (WV_1^2/gr_1)$
$D = W + (WV_1^2/gr_1)$
$R_1 = \sqrt{(W + [W/g][V_1^2/r_1]\cos \theta)^2 + ([W/g][V_1^2/r_1] \sin \theta)^2}$
$R_1$ = resultant force at any angle $\theta$.

From the above description it can be seen that the rotary deck 32 provides a constantly changing force on the kernels and straw as they rotate thus providing agitation to the mixture of grain and straw. Further since a straw is of considerable length in comparison to kernels and is randomly oriented within the deck, a considerable variation in centrifugal force is applied to the individual straws over their length. This difference in force causes agitation of the straw and assists in the separation of the grain from the straw. In order for separation to take place agitation must take place to allow the grain to pass between the straws and find its way to the deck perforations 68.

Generally the relative values of centrifugal force acting upon the kernels and straw can be described using the following equations:

Centrifugal force $F = (Wr\omega^2/g)$
where
 $W$ = weight
 $g$ = acceleration of gravity
 $r$ = radius of rotation
 $\omega$ = speed of rotation, radians per second
Then for example when $r_1 = 0.8\ r$ $$\frac{F}{F_1} = \frac{\frac{W}{g} r\omega^2}{\frac{W}{g} 0.8 r\omega^2}$$

or
 $F = 1.25 F_1$
Also, if
 $r\omega^2 = g$
 $r_1\omega^2 = 0.8g$
and referring to the vector diagram of forces.

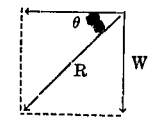
$F = 1.25 \frac{W}{g} r_1\omega^2$

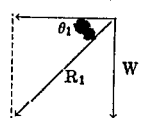
$F_1 = \frac{W}{g} r_1\omega^2$ $\tan \theta = W/1.25(W/g)r_1\omega^2$
and $\tan \theta_1 = W/(W/g)r_1\omega^2$
and if
$r\omega^2 = 1g,$
$r_1\omega^2 = 0.8 \ g$
and
$R = \sqrt{(1.25 \ [W/g]r_1\omega^2)^2 + W^2}$
and
$R_1 = \sqrt{([w/g]r_1\omega^2)^2 + W^2}$
where
$R$ = resultant force.

To provide the optimum agitation and optimum utilization of the separating area (perforations) of the rotary deck 32 it is necessary to select a deck of designated radius while rotating with a designated peripheral velocity. A combination of radius and peripheral velocity such to give a centrifugal force equal to or greater than the weight of the kernels will utilize the total separating area since the kernels will always tend to move outward when located at the deck periphery. If not at the periphery and held by the straw from reaching the periphery a combination of radius and speed of rotation will allow them to fall from the straw holding them and also agitate the straw to provide an open path as soon as their location changes due to rotation and the outward forces again come into operation to take them to the drum periphery.

The preferred combination of deck radius and rotating speed have found to be where the centrifugal force at the periphery of the rotary deck 32 varies between 0.7 – 1.7 times the value of acceleration of gravity.

The rotary deck 32 has been used in experimental form with the following throughput capacities:

| Crop | M.O.G./Grain | *Loss % | Bushels/Hour |
|---|---|---|---|
| Wheat | 1.3 | 1 | 250 |
|  | 1.3 | 2 | 300 |
|  | 1.0 | 1 | 400 |
|  | 1.0 | 2 | 500 |
|  | 0.8 | 1 | 500 |
|  | 0.8 | 2 | 600 |
| Barley | 1.0 | 1 | 250 |
|  | 1.0 | 2 | 325 |
|  | 0.8 | 1 | 345 |
|  | 0.8 | 2 | 410 |
|  | 0.6 | 1 | 460 |
|  | 0.6 | 2 | 550 |
| Oats | 0.9 | 1 | 480 |
|  |  | 2 | 600 |
|  |  | 3 | 700 |
| Rapeseed | Total losses did not exceed 1.5% at rates of harvest of 200 bushels per hour. Crop condition limited the throughput. | | |
| *Note | The losses shown are for the rotary deck only under normal harvesting of windrowed crops. Cleaner losses are not expected to be higher than 0.5% – 0.75% when properly adjusted. | | |

Material other than grain is defined as M.O.G.
Grain is defined as G.

The embodiments of the invention in which an exclusive property or privilege is claimed are defined as follows:

1. A rotary deck apparatus for threshing machines for separating granular material from straw after threshing, comprising: a substantially horizontally oriented open-ended tube-like rotary deck, said deck having an entrance end and an exit end for granular material and straw; said deck being perforated to the extent of 30 – 90 percent of its surface, means for rotating said deck at a speed to produce a peripheral centrifugal force between 0.7 to 1.7 times the value of gravity; and a curved deflector separate from said rotary deck but fixed at a location within the entrance end thereof for deflecting a stream of mixed straw and grain downward onto the interior surface of the rotary deck at the entrance end thereof.

2. An apparatus according to claim 1 wherein the tube-like rotary deck is a straight sided cylinder.

3. An apparatus according to claim 1 wherein the rotary deck has a major and minor diameter, the minor diameter being adapted for placement adjacent a threshing cylinder.

4. An apparatus according to claim 1 wherein the surface of the rotary deck is corrugated.

5. An apparatus according to claim 4 wherein the corrugations are formed in a spiral, rifled pattern.

6. An apparatus according to claim 1 including a plurality of cleats secured to and extending lengthwise of the inner surface of the rotary deck and projecting therein to assist in imparting a rotary motion to material in the deck.

7. An apparatus according to claim 1 additionally comprising means located at the top of the entrance end of the rotary deck for blowing a stream of air along the top of the interior of said rotary deck.

8. An apparatus according to claim 7, additionally comprising a stripping auger located within the top of said rotary deck for removing material from the interior surface of said deck, the axis of said stripping auger extending generally parallel to the axis of the rotary deck.

* * * * *